United States Patent
Gole et al.

(10) Patent No.: US 8,001,307 B1
(45) Date of Patent: Aug. 16, 2011

(54) APPARATUS AND A METHOD TO ELIMINATE DEADLOCK IN A BI-DIRECTIONALLY MIRRORED DATA STORAGE SYSTEM

(75) Inventors: Abhijeet P. Gole, San Jose, CA (US); Andrew E. Dunn, San Jose, CA (US); Prasanna K. Malaiyandi, San Jose, CA (US); Shane S. Owara, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 630 days.

(21) Appl. No.: 11/796,376

(22) Filed: Apr. 27, 2007

(51) Int. Cl.
G06F 13/00 (2006.01)

(52) U.S. Cl. ........ 710/240; 711/114; 711/158; 711/162; 707/610; 714/4.11; 709/232

(58) Field of Classification Search .................. 711/162, 711/114, 158; 707/610; 714/6, 4.11; 710/240; 709/232
See application file for complete search history.

(56) References Cited

U.S. PATENT DOCUMENTS

| | | | |
|---|---|---|---|
| 5,636,360 A | 6/1997 | Courts et al. | |
| 5,687,390 A | 11/1997 | McMillan, Jr. | |
| 5,748,874 A * | 5/1998 | Hicksted et al. | 714/24 |
| 5,787,485 A | 7/1998 | Fitzgerald et al. | |
| 5,870,537 A | 2/1999 | Kern et al. | |
| 6,178,427 B1 | 1/2001 | Parker | |
| 6,226,651 B1 | 5/2001 | Masuda et al. | |
| 6,308,283 B1 | 10/2001 | Galipeau et al. | |
| 6,499,112 B1 | 12/2002 | Milillo et al. | |
| 6,502,205 B1 | 12/2002 | Yanai et al. | |
| 6,578,160 B1 | 6/2003 | MacHardy et al. | |
| 6,636,879 B1 | 10/2003 | Doucette et al. | |
| 6,671,705 B1 | 12/2003 | Duprey et al. | |
| 6,691,245 B1 | 2/2004 | DeKoning | |
| 6,728,898 B2 | 4/2004 | Tremblay et al. | |
| 6,735,603 B2 | 5/2004 | Cabrera et al. | |
| 6,745,303 B2 | 6/2004 | Watanabe | |
| 7,203,796 B1 | 4/2007 | Muppalaneni et al. | |
| 7,370,025 B1 * | 5/2008 | Pandit | 707/610 |
| 2002/0026603 A1 | 2/2002 | LeCrone et al. | |
| 2002/0083281 A1 | 6/2002 | Carteau | |

(Continued)

OTHER PUBLICATIONS

Richard Jones, "Using Synchronous Snapmirror for Disaster Protection With Block-Access Protocols.", Network Appliance, May 2005m TR334.

*Primary Examiner* — Hong Kim
(74) *Attorney, Agent, or Firm* — Blakely, Sokoloff, Taylor & Zafman LLP

(57) ABSTRACT

An apparatus and a method to eliminate deadlock in a bi-directionally mirrored data storage system are presented. In some embodiments, a first and a second storage servers have established a mirroring relationship. To prevent deadlock between the storage servers and to reduce write latency, the second storage server may hold data received from the first storage server in a replication queue and send an early confirmation to the first storage server before writing the data to a destination volume if the first storage server is held up due to a lack of confirmation. In another embodiment, when the first storage server writes metadata of a persistent point-in-time image (PPI) to the second storage server, the second storage server may send a confirmation to the first storage server after copying the metadata, but before exporting the PPI at the second storage server.

22 Claims, 8 Drawing Sheets

U.S. PATENT DOCUMENTS

| | | |
|---|---|---|
| 2002/0138705 A1 | 9/2002 | Suzuki et al. |
| 2002/0178335 A1 | 11/2002 | Selkirk et al. |
| 2002/0194529 A1 | 12/2002 | Doucette et al. |
| 2003/0005355 A1 | 1/2003 | Yanai et al. |
| 2003/0014433 A1 | 1/2003 | Teloh et al. |
| 2003/0084242 A1 | 5/2003 | Strange et al. |
| 2003/0167419 A1 | 9/2003 | Yanai et al. |
| 2004/0073831 A1 | 4/2004 | Yanai et al. |
| 2004/0098637 A1 | 5/2004 | Duncan et al. |
| 2004/0153719 A1 | 8/2004 | Achiwa et al. |
| 2006/0005074 A1* | 1/2006 | Yanai et al. ............ 714/5 |
| 2008/0022058 A1* | 1/2008 | Nadathur et al. ............ 711/162 |

* cited by examiner

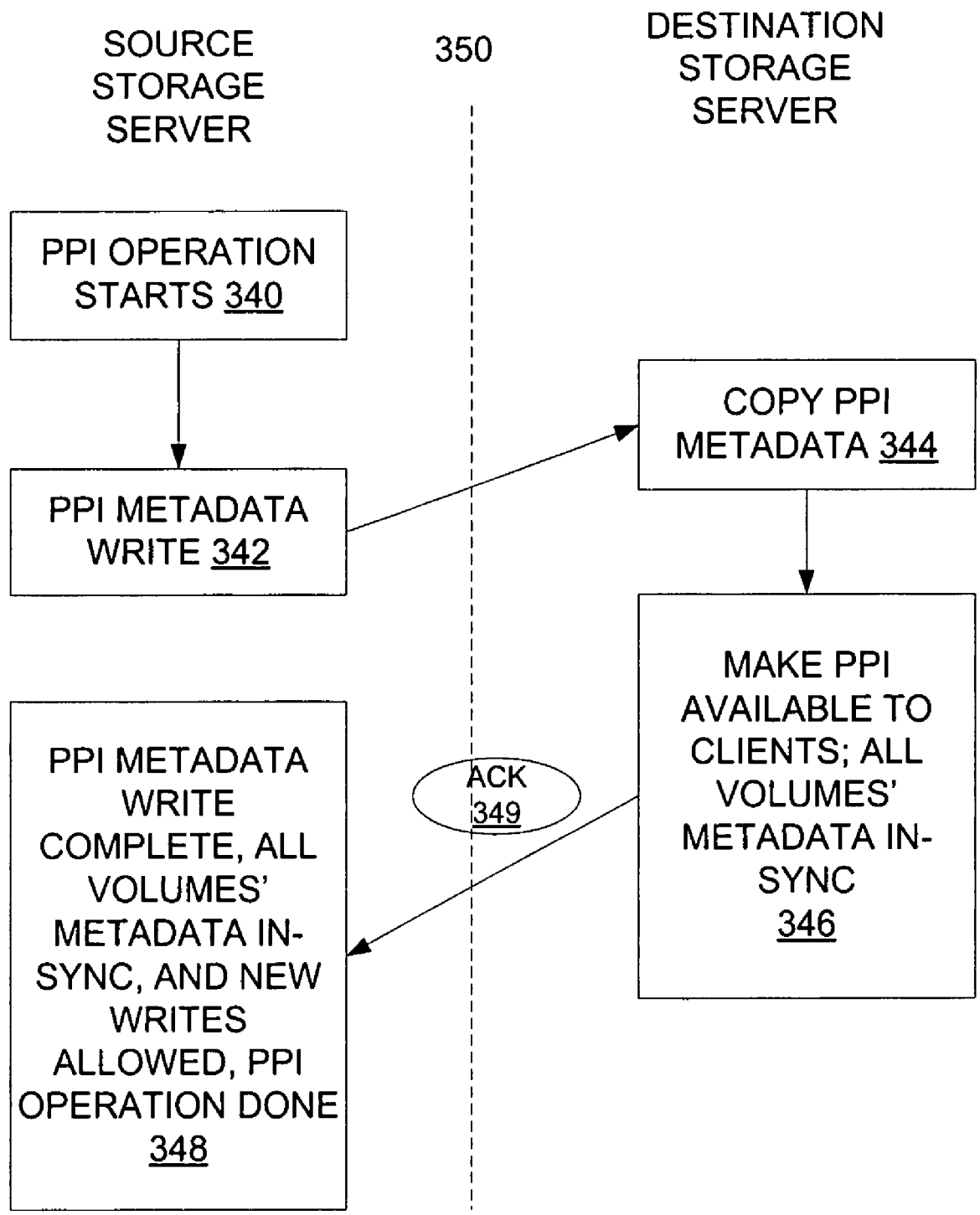
-- PRIOR ART --  FIG. 1A

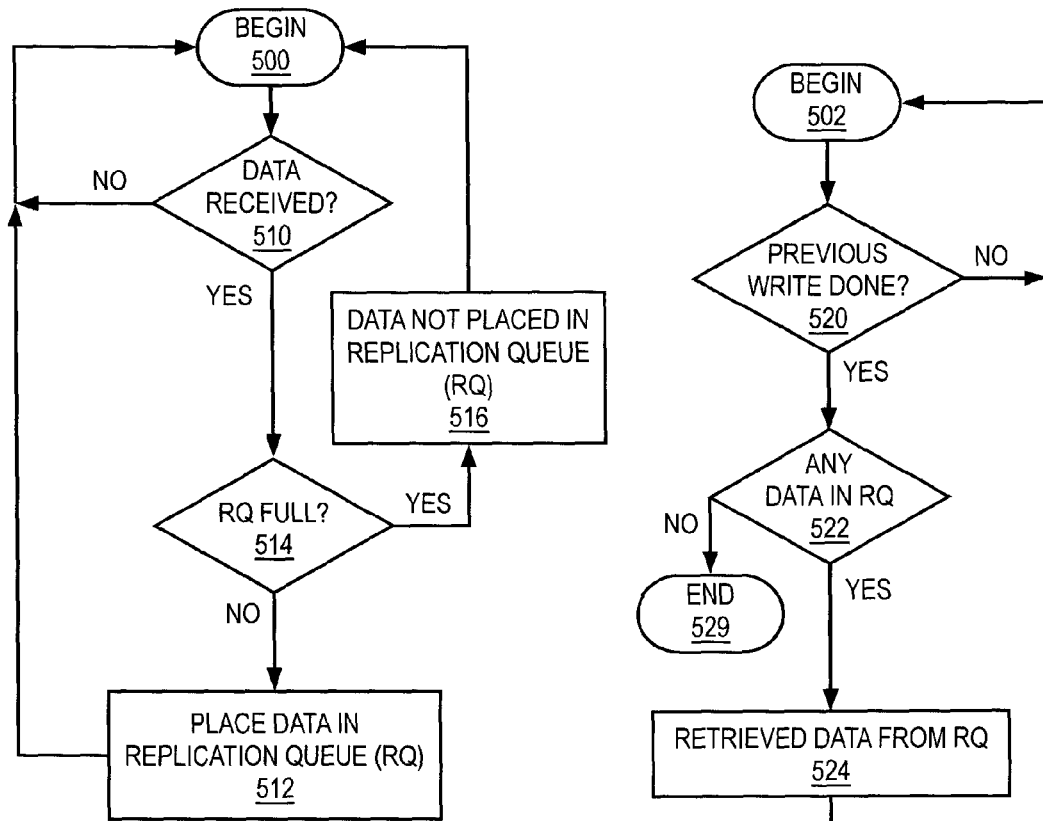
FIG. 5A
FIG. 5B
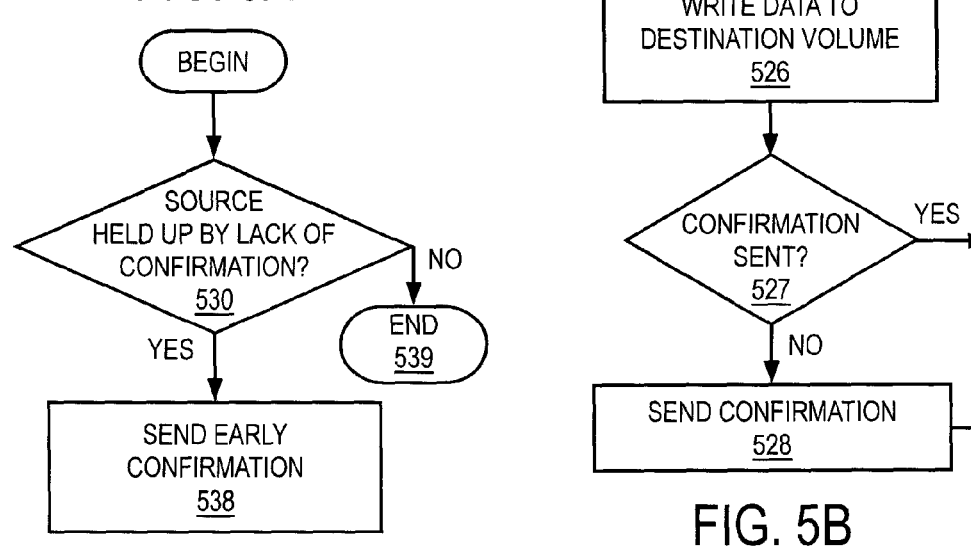
FIG. 5C

APPARATUS AND A METHOD TO ELIMINATE DEADLOCK IN A BI-DIRECTIONALLY MIRRORED DATA STORAGE SYSTEM

TECHNICAL FIELD

The present invention relates to networked data storage systems, and more particularly, to eliminating deadlock in bi-directionally mirrored data storage systems.

BACKGROUND

A networked data storage system can be used for a variety of purposes, such as providing multiple users access to shared data, or facilitating backups or data mirroring. Such data is hereinafter referred to as user data because it is accessed and/or manipulated by users of the networked data storage system. A networked storage system may include a number of storage servers. A storage server may provide services related to accessing and organizing user data on mass storage devices, such as disks. Some storage servers are commonly referred to as filers or file servers, as these storage servers provide clients with file-level access to user data. Some of these filers further provide clients with sub-file level and/or block-level access to user data. An example of such a storage server is any of the filer products made by Network Appliance, Inc. in Sunnyvale, Calif. The storage server may be implemented with a special-purpose computer or a general-purpose computer programmed in a particular way. Depending on the application, various networked data storage systems may include different numbers of storage servers.

In addition to user data, the networked data storage systems have metadata. In general, metadata is created by operating systems of the storage servers in the networked data storage systems for organizing and keeping track of user data. A portion of the metadata is used to create persistent point-in-time images (PPIs) of user data. One example of the PPIs is NetApp Snapshot™ provided by the filer products made by Network Appliance, Inc. in Sunnyvale, Calif.

To facilitate disaster recovery, a first storage server may replicate both user data and metadata (collectively referred to as data in the current document) in a first volume into a second volume, where the second volume becomes a mirror image of the first volume. A volume is a logical data set which is an abstraction of physical storage, combining one or more physical mass storage devices (e.g., disks) or parts thereof into a single logical storage object, and which is managed as a single administrative unit, such as a single file system. The relationship between the first and the second volumes are referred to as a mirroring relationship because the second volume is a mirror image of the first volume. Note that the second volume may be managed by the first storage server or a second storage server. In the following discussion, it is assumed that a second storage server manages the second volume. However, one should appreciate that the concept described herein is applicable to situations in which the first storage server also manages the second volume.

When a PPI is created on the first volume, its metadata is created and replicated onto the second volume. The PPI could be considered "copied" when all the user data and metadata associated with it are replicated over to the second storage server. Then the second storage server makes the PPI available to clients accessing the second storage server.

Conventionally, the first storage server waits for the second storage server to make the PPI available to clients. Thus, the first storage server depends on the second storage server making the PPI available to clients before the first storage server can process other requests that come after the PPI write. The above approach is further illustrated by the flow diagram in FIG. 1A.

Referring to FIG. 1A, the blocks on the left hand side of a dotted line 350 are performed by a source storage server and the blocks on the right hand side of the dotted line 350 are performed by a destination storage server. A PPI operation to replicate a PPI starts in block 340. The source storage server writes the PPI metadata to the destination storage server in block 342. In response to the write, the destination storage server copies the PPI metadata in block 344. After copying the PPI metadata, the destination storage server makes the PPI available to clients at the destination storage server in block 346. At this point, the metadata of both the source and the destination storage servers' volumes are in sync. Finally, an acknowledgement 349 is sent to the source storage server, which now considers the PPI metadata write to be completed in block 348. At this point, all volumes' metadata is in sync and writes that come after the metadata write are allowed. The source storage server also considers the PPI operation done at this point.

However, the above approach leads to both performance issue and potential deadlock situations. There is performance issue because the first storage server would hold up write operations that come in after the PPI have been written to the second storage server until the PPI has been made available to clients by the second storage server. A deadlock could occur when the storage servers have dependencies among themselves. In order to explain the dependencies, the concept of consistency points (CPs) is explained below.

A CP is a predefined event that occurs regularly in a storage server. The CP involves a mechanism by which batches of client writes are committed to a volume's storage devices. A CP occurs when all the user data and metadata of the volume is committed in a transaction-style operation, i.e., either all of the user data and the metadata are committed or none of the user data and the metadata is committed. To do so, the storage server writes the user data and metadata to the volume's storage devices without making any of the user data and metadata active. Then the storage server makes the user data and metadata written active by writing a superblock down to the volume's storage devices. A superblock is a block of metadata which describes the overall structure of the storage system within the volume. For example, the superblock may contain references to metadata of PPI, information about the system that is made available to clients, the name of the storage system, the size of the system, etc. Information in the superblock is used to keep track of the state of the storage system during operation.

Creating a PPI involves adding more volume metadata (a.k.a. PPI metadata) to those already written down to the volume. When a CP is done, all the data and metadata, which includes the PPI metadata, is put down on the volume's storage devices (e.g., a disk), and the superblock is written out. Note that conventionally, the PPI metadata may be in place, but the PPI is not considered created until the superblock is written.

In some conventional system configuration, such as a bi-directional configuration or a circular configuration, the CPs of two storage servers may be dependent on each other such that both sides are waiting on the other side to transition to their respective next CP before they could move onto their next CPs. Specifically, a PPI operation on a source storage server results in a CP on the source storage server. The PPI operation further sends user data and metadata to a destination storage server. The destination storage server would buffer the user data and metadata in memory and write the user data and metadata to storage devices (e.g., disks) corresponding to a mirror volume in the background. Since it is a PPI operation, the destination storage server needs to flush all of the user data and metadata to the storage devices before the destination storage server can make the PPI available to clients. Note that the user data and metadata are written to the storage devices indirectly through a file-system CP operation conventionally. In other words, a CP has to be triggered on the destination storage server and thus, the CP on the source storage server is linked to the CP on the destination storage server. As such, a deadlock between the two storage servers results. A conventional exemplary bi-directional configuration is shown in FIG. 1B.

Referring to FIG. 1B, the system 300 includes two storage servers 310 and 320, coupled to each other via a networked connection 305. The storage server 310 manages volumes A 311 and B' 312. Likewise, the storage server 320 manages volumes B 321 and A' 322. The data in volume A 311 is replicated onto volume A' 322 and the data in volume B 321 is replicated onto volume B' 312, as represented by the dashed arrows 306A and 306B, respectively. In other words, volume A' 322 is a mirror image of volume A 311 and volume B' 312 is a mirror image of volume B 321. Thus, the storage servers 310 and 320 are in a bi-directional mirroring configuration. The storage servers 310 and 320 are further coupled to client machines, which may access data in the volumes A 311, B' 312, B 321, and A' 322 via the storage servers 310 and 320, respectively.

When the storage server 310 writes the metadata of a PPI of volume A 311 to the storage server 320 in order to replicate the PPI to volume A' 322, the storage server 320 does not send a confirmation or acknowledgement for the write to the storage server 310 until the metadata has been copied onto the storage server 320 and the storage server 320 has made the PPI available to clients according to the conventional practice. If the storage server 320 simultaneously writes the metadata of a second PPI of volume B 321 to the storage server 310, the storage server 310 likewise would not send a confirmation for this write to the storage server 310 until the metadata has been copied onto the storage server 310 and the storage server 310 has made the PPI available to clients. However, neither storage servers 310 and 320 would complete the process of making its own PPI available to clients because the storage servers 310 and 320 have outstanding write operations as the storage servers 310 and 320 have not yet received the confirmation for the write operations. As such, a deadlock is resulted between the storage servers 310 and 320.

Note that a similar problem exists with multiple conventional storage servers having a circular configuration. For example, three conventional storage servers A, B and C may have a potential deadlock between them when storage server A mirrors one of its volume to another volume managed by storage server B, storage server B mirrors one of its volume to another volume managed by storage server C, and storage server C mirrors one of its volume to another volume managed by storage server A.

SUMMARY

The present invention includes an apparatus and a method to eliminate deadlock in a bi-directionally mirrored data storage system. In some embodiments, a first and a second storage servers have established a mirroring relationship. To prevent deadlock between the storage servers and to reduce write latency, the second storage server may hold data received from the first storage server in a replication queue and send an early confirmation to the first storage server before writing the data to a destination volume if the first storage server is held up due to a lack of confirmation. In another embodiment, when the first storage server writes metadata of a PPI to the second storage server, the second storage server may send a confirmation to the first storage server after copying the metadata, but before exporting the PPI at the second storage server.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 1A illustrates a flow diagram of a conventional process to perform a PPI operation when a volume is mirrored.

FIGS. 5A to 5C illustrate flow diagrams of some embodiments of a process to replicate data using a replication queue;

DETAILED DESCRIPTION

Figure 1B:
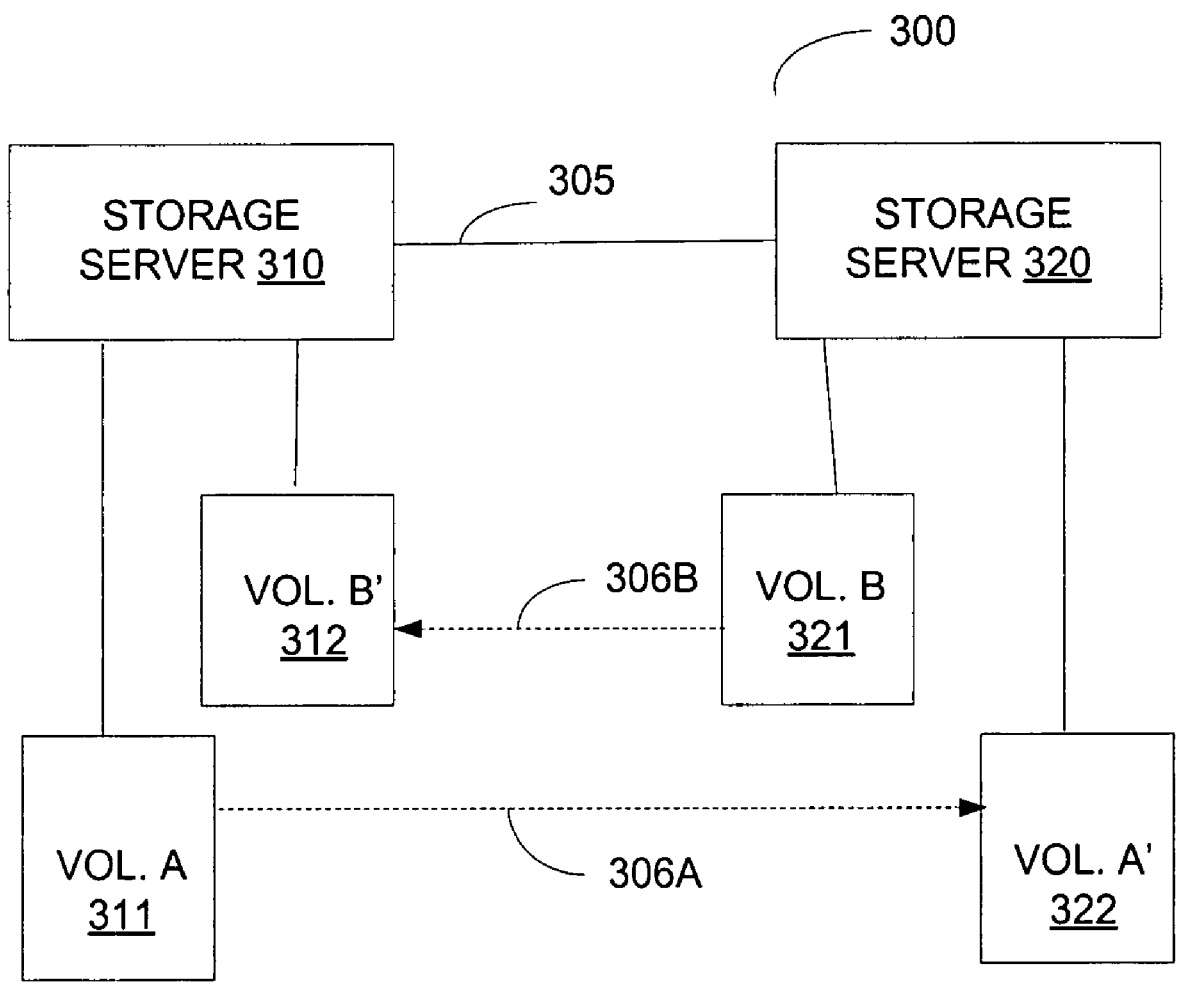
FIG. 1B illustrates a conventional networked data storage system having a bi-directional configuration.

An apparatus and a method to eliminate deadlocks in a bi-directionally mirrored data storage system are described. By moving confirmation of a write operation earlier in the write path, dependencies between two storage servers in the bi-directionally mirrored data storage system are removed. As a result, potential deadlocks between the storage servers are avoided. To simplify the present disclosure, the following patent applications and patent on synchronous mirroring in a networked data storage system are hereby incorporated by reference in the present disclosure as if fully set forth herein: U.S. Pat. No. 7,203,796, entitled "METHOD AND APPARATUS FOR SYNCHRONOUS DATA MIRRORING," filed on Oct. 24, 2003; U.S. patent application Ser. No. 10/692, 495, entitled "SYNCHRONOUS MIRRORING INCLUDING WRITING IMAGE UPDATES TO A FILE," filed on Oct. 24, 2003; and U.S. patent application Ser. No. 10/692, 665, entitled "A METHOD AND APPARATUS TO MIRROR DATA AT TWO SEPARATE SITES WITHOUT COMPARING THE DATA AT THE TWO SITES," filed on Oct. 24, 2003. In the following description, numerous specific details are set forth. However, it is understood that embodiments of the invention may be practiced without these specific details. In other instances, well-known components, structures, and techniques have not been shown in detail in order not to obscure the understanding of this description.

In some embodiments, a first storage server is communicatively coupled to a second storage server. For instance, the first and the second storage servers may be coupled to each other in a bi-directional configuration. Alternatively, the first and the second storage servers may be coupled to each other in a circular configuration. Data is replicated between a first set of volumes and a second set of volumes managed by the first and the second storage servers, respectively, where neither of the first or the second storage servers depends on a completion of a jump ahead in the other storage server. As a result, the potential deadlock between the first and the second storage servers may be avoided and the write path's latency may be reduced.

According to one embodiment of the invention, the second storage server acknowledges a write to the first storage server prior to the exporting of a PPI of one of the first set of volumes has been completed by the second storage server. In other words, the second storage server essentially takes the exporting of PPI out of the write path. This approach may be referred to as asynchronous jump ahead because the exporting of the PPI is done asynchronously with respect to the write. More details on asynchronous jump ahead are described in the following section.

In another embodiment, the second storage server temporarily places data (including user data and metadata) from the first storage server into a replication queue at the second storage server. If the second storage server determines that the data flow from the first storage server is blocked because of not receiving a confirmation for a write yet and the second storage server already has received all the data available for the write to the second volume, then the second storage server sends an early confirmation to the first storage server. This is an early confirmation because the confirmation is sent before the second storage server has actually written the data to the second volume. As such, the first storage server may not have to delay other operations while waiting for the write confirmation. Further, the queue helps to preserve the order of the write operations because the queue keeps the data in the order the data is received. Therefore, the data written to the second storage server, and subsequently to the second volume, is always consistent with the data in the first volume. Note that the data held in the replication queue may span across multiple consistency points. Thus, this approach is also referred to as early confirmation and fall-behind consistency. This approach is referred to as early confirmation because the confirmation for the write is sent earlier than the data being actually committed to the destination volume. Further, this approach is also referred to as fall-behind consistency because the second storage server falls behind in consistency points. Further, the queue keeps the replica filesystem in the second storage server consistent despite the fact that the replica filesystem is falling behind. More details about various embodiments of the above approach and the concept of consistency point are discussed below. Note that the data not yet written to the second volume may be stored in a persistent store, such as a non-volatile random access memory (NVRAM), so that the data would not be lost. In particular, user data is always committed to a persistent store on the second storage server. But metadata confirmed but not yet written to the second volume may not be stored in a persistent store in the second storage server because the metadata may be recopied from the first storage server or reconstructed on the second storage server in a disaster recovery scenario.

Asynchronous Jump Ahead

As mentioned above, a storage server may take the exporting of PPI out of the write path according to one embodiment of the invention. The process of exporting the PPI, and thus making the PPI visible on a destination storage server in a mirroring relationship, is referred to as a "jump ahead" process on the destination storage server because the data viewed by clients accessing the destination storage server appears to jump ahead in time.

Figure 3:
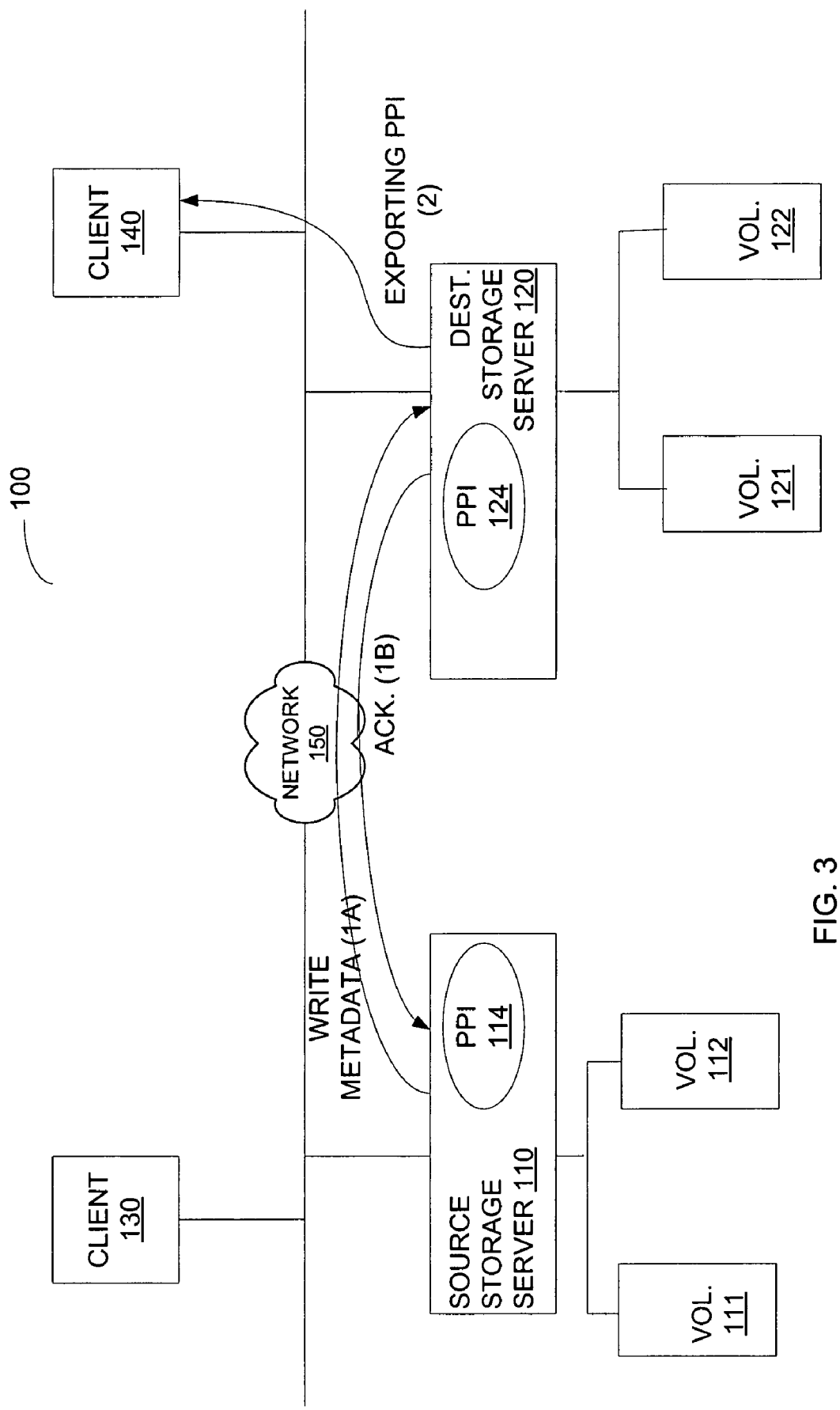
FIG. 3 illustrates an embodiment of a networked storage system.

FIG. 3 shows a networked data storage system 100 according to some embodiments of the present invention. The system 100 includes client machines 130 and 140, a source storage server 110, a destination storage server 120, and a number of volumes 111, 112, 121, and 122. Specifically, the storage server 110 manages volumes 111 and 112 while the storage server 120 manages volumes 121 and 122. The client machines 130 and 140 may be implemented on personal computers (PCs), laptop computers, hand-held devices, special purpose computing devices, etc. The storage servers 110 and 120 and the client machines 130 and 140 are coupled to each other via a network 150, which may be or include a local area network (LAN), a wide area network (WAN), etc. Moreover, the network connections may be wireline, wireless, or a combination of both. As such, the above components may or may not be located at different geographical locations.

In one embodiment, data is stored and transferred in units of files in the data storage system 100. Therefore, the system 100 may be a file-based networked storage system. In such an embodiment, the system 100 can be a network-attached storage (NAS) system that provides clients with access to data at the file level. A NAS system uses file access protocols to retrieve data, such as, for example, Network File System (NFS) or Common Internet File System (CIFS). The files are logically arranged into directories. Alternatively, the system 100 may include or be part of a storage area network (SAN), to provide clients with access to data at the block level of storage servers. A block is the basic unit of data used by a file system in a storage server in the SAN to manipulate and transfer data. Alternatively, the data storage system 100 may provide clients with access to data at both the block level and the file level.

Note that any or all of the components of system 100 and associated hardware may be used in various embodiments of the present invention. However, it can be appreciated that other configurations of the networked data storage system may include more or fewer devices than those discussed above.

In one embodiment, the source storage server 110 stores data in the volumes 111 and 112. In the event of a disaster (e.g., earthquake, fire, flood, etc.), the source storage server 110 and/or the volumes 111 and 112 may be damaged or destroyed. To allow recovery of the data, the source storage server 110 stores a replica of the data in a volume (such as volume 111 or volume 112) on another volume managed by the destination storage server 120 (such as volume 121 or volume 122). For example, a replica of the data in volume 112 is stored in volume 122. The replica may be referred to as a mirror image of the volume managed by the source storage server 110. In other words, the source storage server 110 and the destination storage server 120 have a mirroring relationship established between them. The source storage server 110 synchronously replicates data onto the destination storage server 120.

In some embodiments, the source storage server 110 periodically (e.g., every three minutes, every fifteen minutes, etc.) creates a persistent point-in-time image (PPI) of the data in the volume 112. Note that the period between the automatic creations of the PPI may be adjustable. For instance, an administrator of the system 100 may adjust the period by changing a corresponding parameter in a configuration file. Note that the configuration file may be on the destination storage server 120 or the source storage server 110. To create the PPI, the source storage server 110 generates PPI metadata. Since the source storage server 110 and the destination storage server 120 has a synchronous mirroring relationship between them, the source storage server 110 forwards the data (both user data and metadata) of all writes for the source volume to the destination volume (i.e., the mirror volume) as the writes occur. This implicitly copies the PPI because the PPI metadata (i.e., the metadata used to create the PPI of the source volume) is also forwarded to the destination storage server 120 along with the metadata of the writes. The implicit replication of the PPI triggers the jump ahead process (i.e., the process that makes the PPI visible on the destination storage server) in the destination storage server. In general, the jump ahead process is triggered when a new PPI appears and/or an existing PPI goes away. During the jump ahead process, the destination storage server exports the PPI to make the PPI visible to clients accessing the destination storage server. In some embodiments, the destination storage server performs the jump ahead process by changing a reference (e.g., a pointer) from a currently-visible PPI to a new PPI. However, the old PPI may or may not be discarded after the jump ahead process.

As mentioned above, a conventional destination storage server does not acknowledge that the metadata has been replicated until the above jump ahead process is also completed. In other words, the replication of the PPI, which involves copying the metadata, and the exporting of the PPI to the clients are tied together, and the source storage server does not consider the PPI operation to be completed until both copying and exporting have been done. However, this practice increases latency of the write operation and may delay the source storage server 110 from performing other operations pending the completion of the write operation. Thus, the destination storage server 120 acknowledges that the write operation has been completed before the jump ahead process has been completed according to some embodiments of the invention. As a result, the jump ahead process in the destination storage server 120 may not remain synchronous with the write operation. Therefore, the jump ahead process in the destination storage server 120 may be referred to as asynchronous jump ahead in some embodiments. An exemplary flow of an asynchronous jump ahead process is described in detail below to illustrate the technique.

In one embodiment, the source storage server 110 writes some metadata (1A) to the destination storage server 120 for mirroring. After the metadata has been replicated onto the destination storage server 120, the destination storage server 120 sends an acknowledgement (1B) to the source storage server 110 to confirm the write (1A). Further, the metadata sent to the destination storage server 120 includes PPI metadata of a new PPI 114. In other words, the replication of the metadata (1A) to the destination storage server 120 implicitly replicates the PPI 114, which is represented by PPI 124 in FIG. 3. The destination storage server 120 also exports the new PPI using the PPI metadata to allow the client 140 accessing the destination storage server 120 to view the new PPI 124.

Note that the exporting of the PPI 124 at the destination storage server 120 may not have been completed by the time the destination storage server 120 sends the acknowledgement (1B) to the source storage server 110.

In some circumstances, the clients 130 and/or 140 may desire the access the destination storage server 120 for the mirror image of the data instead of the source storage server 110. For example, the source and destination storage servers 110 and 120 may locate at two different geographical areas and the client wanting access to the data locates closer to the destination storage server 120 than the source storage server 110. Thus, it may be more cost-efficient and/or faster for the client to access the destination storage server 120 instead of the source storage server 110. In another example, the source storage server 110 may have already become overloaded with requests from other clients. Thus, by offloading some of the client requests to the destination storage server 120 instead of the source storage server 110, the performance of the system 100 may be improved.

Unlike the conventional approach, the destination storage server 120 does not wait until the PPI 124 has been exported to send the acknowledgement (1B) to the source storage server 110. As a result, the source storage server 110 does not hold up other write operations in response to write requests made after the write operation (1A) has begun, waiting for the acknowledgement (1B). Thus, the latency of these write operations is reduced. Another advantage of the above approach is the elimination of the possible deadlock of the system 100 when both the storage servers 110 and 120 attempt to mirror data onto each other. Specifically, the storage servers 110 and 120 may be arranged in a bi-directional configuration such that the storage server 110 mirrors data on the volume 112 to the volume 122 while the storage server 120 mirrors data on the volume 121 to the volume 111, similar to the configuration illustrated in FIG. 1B. As explained in the Background section, the storage servers in the bi-directional configuration may be trapped in a deadlock by waiting for each other to complete exporting PPIs before sending acknowledgements for metadata to each other under the conventional approach. The above approach sends the acknowledgement (1B) without waiting for the exporting of the PPI (2) to be completed. Thus, the potential deadlock suffered by the conventional approach may be eliminated.

Figure 2:
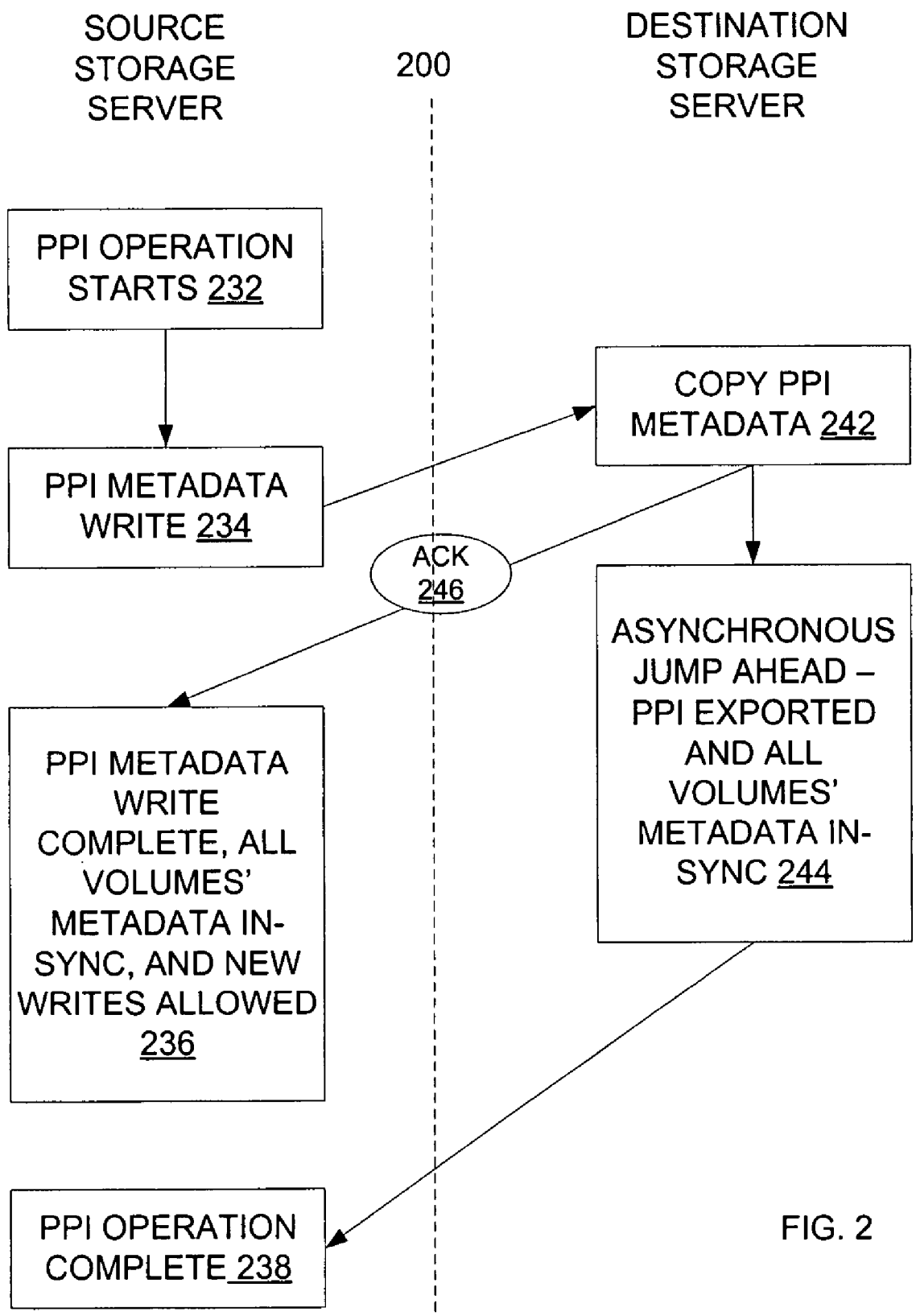
FIG. 2 shows a flow diagram of one embodiment of a process to perform a PPI operation.

To contrast with the conventional approach discussed in the Background section, a flow diagram of a process to perform a PPI operation according to some embodiments of the present invention is shown in FIG. 2. Referring to FIG. 2, blocks on the left side of dotted line 200 are performed by a source storage server, while blocks on the right hand side of the dotted line 200 are performed by a destination storage server. The source storage server initiates a PPI operation in block 232. The source storage server writes the PPI metadata to the destination storage server at block 234. In response to the write, the destination storage server copies the PPI metadata at block 242. After copying the PPI metadata, the destination storage server sends an acknowledgement 246 to the source storage server and transitions to block 244 to perform a jump ahead process. The jump ahead process is also referred to as asynchronous jump ahead process because this jump ahead process is asynchronous with respect to the PPI metadata write in block 234. As discussed above, the destination storage server exports the PPI during the asynchronous jump ahead. At this point, all volumes' metadata is in sync. Note the destination storage server does not wait until the jump ahead process is completed before sending the acknowledgement 246.

When the source storage server receives the acknowledgement 246, the source storage server considers the PPI metadata write to be completed in block 236. Again, all volumes' metadata is in sync now and writes that come after the PPI metadata write are allowed. Finally, when the destination storage server completes the asynchronous jump ahead process, the source storage server considers the PPI operation to be completed at block 238.

Early Confirmation and Fall-Behind Consistency

Figure 4:
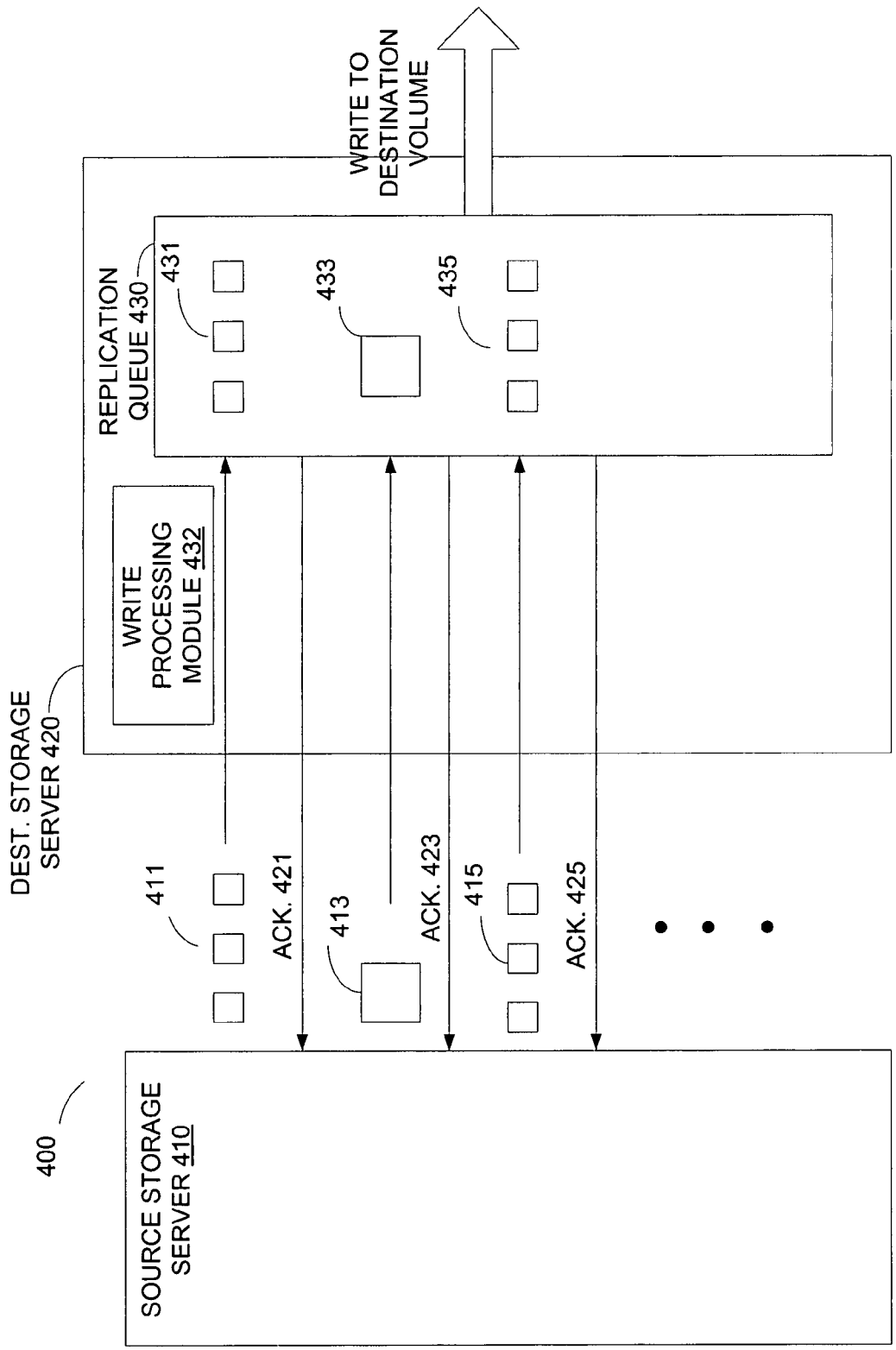
FIG. 4 illustrates one embodiment of queuing in an exemplary networked data storage system.

In addition to, or as an alternative to, the above approach, the write latency may be reduced and the potential deadlock may be eliminated using an approach referred to as early confirmation and fall-behind consistency. Details of some embodiments of early confirmation and fall-behind consistency are described below. FIG. 4 illustrates an alternative embodiment of a storage system. The storage system 400 includes a source storage server 410 and a destination storage server 420. The source storage server 410 is communicatively coupled to the destination storage server 420 via a network, which may include a LAN, a WAN, etc. There is a mirroring relationship established between the source storage server 410 and the destination storage server 420, where data in a volume managed by the source storage server 410 (hereinafter, the source volume) is replicated or mirrored to a volume managed by the destination storage server 420 (hereinafter, the destination volume). The destination volume may include a virtual volume, which is a virtualization layer that logically interfaces a file system to the destination storage server 420. In some embodiments, the destination storage server 420 includes storage adaptor to interface with a set of physical storage resources (e.g., magnetic disks, optical disks, tapes, etc.). The virtual volume is a logical data container managed by the destination storage server 420 independently from the physical storage resources that contain the data in the logical data container. Thus, a first portion of the data in the virtual volume may be stored in a first disk while a second portion of the data may be stored on a second disk.

The destination storage server 420 includes a replication queue 430 and a write processing module 432. The write processing module 432 is implemented using software, hardware, firmware, or a combination of any of the above. The replication queue 430 is implemented using a portion of a memory or a storage device within the destination storage server 420. One exemplary data flow between the source storage server 410 and the destination storage server 420 will now be described in detail to illustrate the technique.

To mirror the source volume onto the destination volume managed by the destination storage server 420, the source storage server 410 sends a number of data blocks 411 to the destination storage server 420 to be written to the destination volume. When the destination storage server 420 receives the data blocks 411, the write processing module 432 temporarily places the data blocks 411 into the replication queue 430, which are represented in FIG. 4 as data blocks 431. After the data blocks 431 have been placed in the replication queue 430, the destination storage server 420 determines if the source storage server is blocking further data transfer waiting for an acknowledgement from the destination storage server 420. If so, the destination storage server 420 checks if all the data needed for a current write operation are available in the replication queue 430. If so, then the write processing module 432 sends an acknowledgement 421, also referred to as a write confirmation, to the source storage server 410 to confirm writing of the data blocks 431, even though the data blocks 431 have not yet been written to the destination volume. Thus, the acknowledgement 421 may be referred to as an early confirmation. In contrast, some conventional storage servers do not acknowledge the write until the data has been written to the destination volume.

In response to the acknowledgement 421, the source storage server 410 sends the next data block 431, which is a superblock in the current example, to the destination storage server 420. A superblock is a data block containing information about a volume. Likewise, the write processing module 432 temporarily places the superblock 431 into the replication queue 430, which is represented in FIG. 4 as superblock 433. Then the destination storage server 420 determines if the source storage server is blocking further data transfer waiting for an acknowledgement from the destination storage server 420. If so, the destination storage server 420 checks if all the data needed for a current write operation are available in the replication queue 430. If so, then the write processing module 432 sends an acknowledgement 423 to the source storage server 410 to confirm writing of the superblock 433 even though the superblock 433 has not yet been written to the destination volume. In response to the acknowledgement 423, the source storage server 410 sends more data blocks 415 to the destination storage server 420. Again, the write processing module 432 places the data blocks 415 into the replication queue 430, which are represented as data blocks 435 in FIG. 4, and the destination storage server 420 determines if the source storage server is blocking further data transfer waiting for an acknowledgement from the destination storage server 420. If so, the destination storage server 420 checks if all the data needed for a current write operation are available in the replication queue 430. If so, then the destination storage server 420 sends an acknowledgement 425 to the source storage server 410. The data blocks 431, the superblock 433, and the data blocks 435 would later be retrieved out of the replication queue 430 in the order they have been placed into the replication queue 430.

In some embodiments, the data blocks 431 and 435 contain user data, which is stored in persistent storage (e.g., NVRAM) in the destination storage server 420. Thus, even with early confirmations "tricking" the source storage server 410 before the user data is committed to the destination volume, the destination storage server 420 would not lose the user data.

Note that as the source destination server 410 receives acknowledgements 421, 423, and 425 from the destination server 420 confirming the corresponding write operations of the data blocks 411, the super block 413, and the data blocks 415, respectively, the source storage server 410 may transition or advance from one CP to the next CP because the source storage server 410 has been "tricked" to believe that the write operations have been completed. Thus, the data blocks 431, the superblock 433, and the data blocks 435 may span across multiple CPs. Even though the destination volume has a mirroring relationship with the source volume managed by the source storage server 410, the data written to the destination volume may be falling behind the current CP of the source storage server 410, while some of the more recent data blocks (e.g., the data blocks 431 and 435 and the superblock 433) are still waiting in the replication queue 430. However, by sending acknowledgements (e.g., acknowledgements 421, 423, and 425) without waiting for the corresponding data blocks being written to the destination volume, the source storage server 410 does not have to delay the transfer of data to the destination storage server 420, thus, write times may be smoothed out over many writes. Further, the source storage server 410 may advance or transition to its next CP after receiving the acknowledgement from the destination storage server 420. As such, the source storage server 410 does not have to delay other operations that cannot be completed and/or performed until the next CP, thus, preventing deadlock and/or delay of other operations at the source storage servers 420.

When the destination storage server 420 is done writing the data to the destination volume, the write processing module 432 retrieves the next data block(s) from the replication queue 430 to write to the destination volume. As the data blocks are retrieved from the replication queue 430, storage space in the replication queue 430 is freed up for more data blocks from the source storage server 410. Since the data blocks 431 and 435 and the superblock 433 are stored in the replication queue 430 according to the order in which they have arrived, the data blocks 431 and 435 and the superblock 433 would be written to the destination volume in the order they have been sent by the source storage server 410. Therefore, the data blocks 431 and 435 and the superblock 433 would still be written to the destination volume in the correct sequence even though the data blocks 431 and 435 and the superblock 433 may have been temporarily placed in the replication queue 430 across multiple CPs of the source storage server 410. As such, the replication queue 430 keeps writes from colliding. That is, when data blocks are retrieved from the replication queue 430 to be written into the destination volume, the data blocks are retrieved in the order they have arrived at the destination storage server 420. As such, multiple write operations are kept separate and the sequence of the write operations may be maintained. In other words, the replica of the data in the destination volume is consistent with the data in the source volume even though the source storage server may be sending over data of a new write operation.

The processing module 432 may provide flow control on the data transfer from the source storage server 410 to the destination storage server 420. In some embodiments, the processing module 432 halts the flow of data by withholding acknowledgements if one or more predetermined conditions are met. For instance, when the replication queue 430 becomes full, the processing module 432 may temporarily halt the flow of data blocks from the source storage server 410 by withholding an acknowledgement for the most recently received data block(s) from the source storage server 410. The source storage server 410 does not send any more data blocks to the destination storage server 420 until the source storage server 410 receives the acknowledgement for the most recently sent data block(s). After some of the data blocks in the replication queue 430 have been written to the destination volume (thus, freeing up some space in the replication queue 430), the processing module 432 may send the withheld acknowledgement to the source storage server 410. When the source storage server 410 receives the acknowledgement, the source storage server 410 resumes sending data blocks to the destination storage server 420. As such, the above approach helps to smooth flow control from the source storage server 410. The costs of some write operations are amortized into others, which helps reduce performance spikes.

The above process to replicate data from the source storage server to the destination server using the replication queue is further explained with reference to the flow diagrams in FIGS. 5A to 5C. FIGS. 5A to 5C illustrate flow diagrams of some embodiment of a process to replicate data from the source storage server to the destination server using a replication queue. In some embodiments, the process is performed by processing logic in an operating system of a storage server, such as the destination storage server 420 in FIG. 4.

Referring to FIG. 5A, the process begins at processing block 500. In some embodiments, processing logic checks if any data is received from a source storage server, such as the source storage server 410 in FIG. 4 (processing block 510). If there is no data received, processing logic returns to processing block 500. If there is data received, processing logic checks if a replication queue (e.g., replication queue 430 in FIG. 4) in the destination storage server is full (processing block 514). If the replication queue is not full, processing logic places the data in the replication queue (processing block 512) and then transitions back to processing block 500. At processing block 500, processing logic repeats the above process until data transfer to the destination storage server stops. If the replication queue is full, processing logic does not place the data in the replication queue (processing block 516) and then transitions back to processing block 514. As such, processing logic may hold onto the data that is not enqueued. When the replication queue has space, processing logic may enqueue the data.

Referring to FIG. 5B, processing logic checks if a previous write operation on a destination volume is done (processing block 520). If not, processing logic returns to processing block 502. Otherwise, processing logic further checks if there is any data in the replication queue (processing block 522). If there is none, processing logic transitions back to processing block 502. Otherwise, processing logic retrieves the data from the replication queue (processing block 524). As discussed above, the data may include data blocks and/or super block. Then processing logic writes the data to the destination volume (processing block 526). Processing logic then checks if an early confirmation has been sent earlier (processing block 527). If not processing logic sends a confirmation (processing block 528) and returns to processing block 502. Otherwise, processing logic returns to processing block 502. At processing block 502, processing logic repeats the above process.

Referring to FIG. 5C, processing logic checks if the source storage server is held up by a lack of confirmation from the destination storage server (processing block 530). If so, processing logic sends an early confirmation to the source storage server (processing block 538). Otherwise, the process ends (processing block 539).

Storage Operating System

Figure 6A:
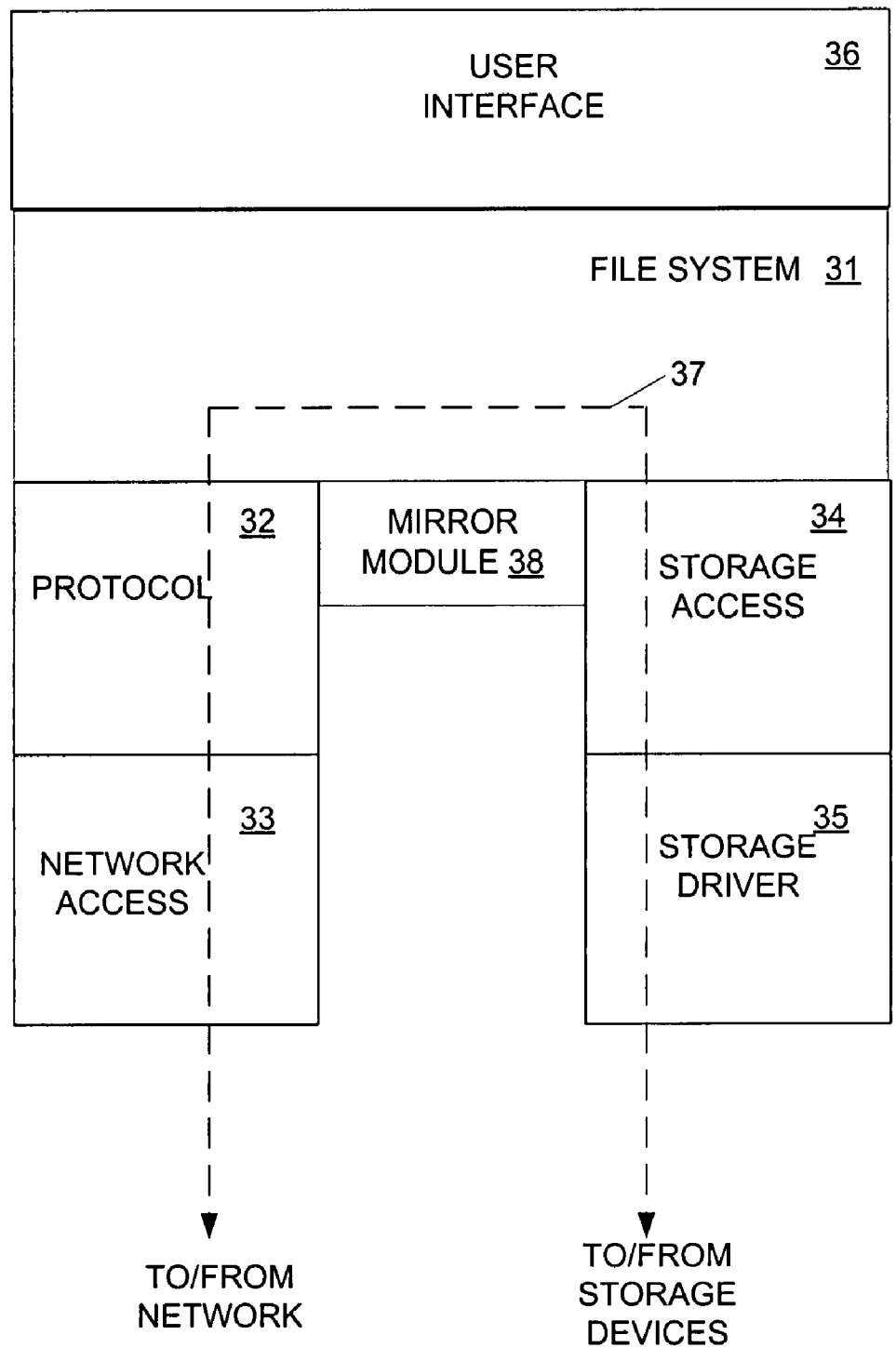
FIG. 6A illustrates a block diagram of one embodiment of a storage operating system.

FIG. 6A illustrates a block diagram of one embodiment of a storage operating system in an exemplary storage server usable to perform the above operations. The storage operating system 24 includes a user interface 36, a file system 31, a protocol layer 32, a network access layer 33, a storage access layer 34, and storage drivers 35. The network access layer 33 includes a network access driver, such as an Ethernet driver. On top of the network access layer 33 sits the protocol layer 32, which provides multi-protocol data access, such as Hypertext Transfer Protocol (HTTP), Common Internet File System (CIFS) protocol, Network File System (NFS) protocol, etc. On the other side of the storage operating system 24, there is a set of storage drivers 35. The storage drivers 35 implement storage device access protocols, such as a Small Computer Systems Interface (SCSI) protocol. Above the storage drivers 35, there is a storage access layer 34. The storage access layer 34 implements a storage device protocol, such as a Redundant Array of Independent Disks (RAID) protocol. The storage access layer 34 is coupled to the protocol layer 32 by the file system 31. A user interface layer 36 sits on top of the file system 31. The user interface layer 36 may generate user interface (e.g., graphical user interface (GUI), command line interface (CLI), etc.) to interact with a user, such as a storage system administrator.

In some embodiments, the file system 31 accesses data stored in storage devices operatively coupled to the storage server on which the storage operating system 24 is implemented. An exemplary storage access request data path 37 is shown in FIG. 6A going through the network access layer 33, the protocol layer 32, the file system 37, the storage access layer 34, and the storage drivers 35. To illustrate data access via the path 37, an example is described in detail below.

In one embodiment, a request is forwarded to the storage server on which the storage operating system 24 is implemented. The request may be from a client (e.g., clients 130 and 140 in FIG. 1) or from another storage server (e.g., source storage server 110 or destination storage server 120 in FIG. 1). For instance, the client request may be in a CIFS protocol packet and may be forwarded to the storage server via a network adopting an Ethernet connection. The network access layer 33, which may include an Ethernet driver, processes the packet, and passes it onto the protocol layer 32. The protocol layer 32 processes the packet and then forwards the packet to the file system 31. Based on the client request, the file system 31 generates operations to access data on the storage devices. The file system 31 then sends the commands and/or data associated with the operations to the storage access layer 34. The storage access layer 34 may map a logical storage unit number (e.g., a logical volume block number) of the data to a physical storage unit number (e.g., a disk block number). The storage access layer 34 then sends the commands and/or data to the storage drivers 35, which access the storage devices (e.g., disks) using the physical storage unit number from the storage access layer 34 (e.g., to write the data on the storage devices, or to read data from the storage devices).

In some embodiments, the storage server has established a mirroring relationship with another storage server. Thus, the storage server may write to a storage device, which mirrors a source storage device of the other storage server, in response to a write operation from the other storage server. A mirror module 38 operatively coupled to the file system 31, the protocol layer 32, and the storage access layer 34, implements mirroring operations as described in detail above.

Storage Server

Figure 6B:
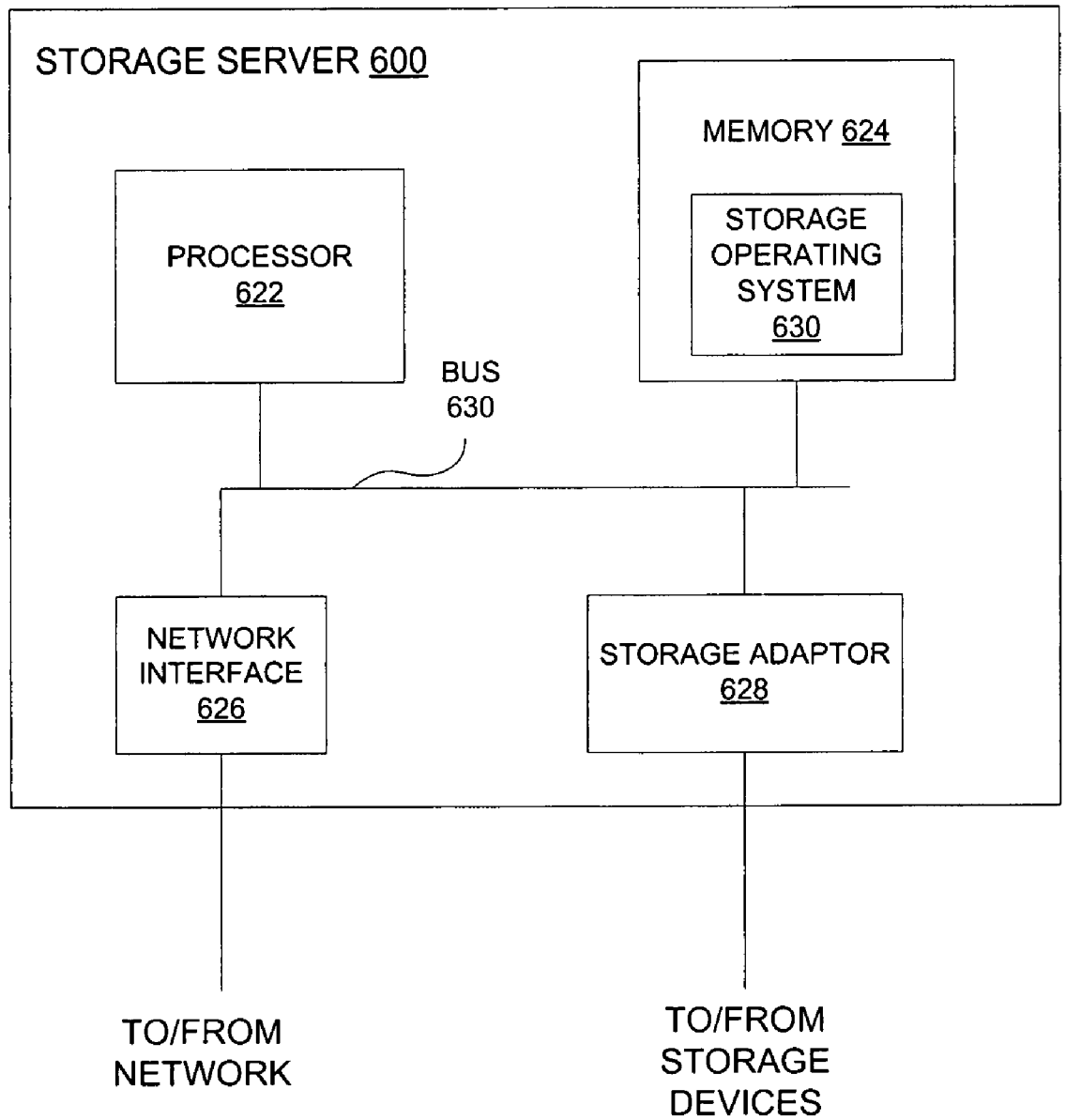
FIG. 6B illustrates one embodiment of a storage server.

One embodiment of a storage server 600 which may implement the above described techniques is illustrated in FIG. 6B. The storage server 600 may be used as the source storage server 110 in FIG. 1, the destination storage server 120 in FIG. 1, the source storage server 410 in FIG. 4, and/or the destination storage server 420 in FIG. 4. Referring to FIG. 6B, the storage server 600 includes a processor 622, a memory 624, a network interface 626, and a storage adaptor 628, which are coupled to each other via a bus system 630. The bus system 630 may include one or more buses and/or interconnects. The storage server 600 communicates with a network (e.g., the Internet) via the network interface 626, which can be an Ethernet adaptor, Fibre Channel adaptor, etc. The network interface 626 may be coupled to a public network, a private network, or a combination of both in order to communicate with a client machine (such as the client machines 130 and 140 in FIG. 1).

In one embodiment, the processor 622 reads instructions from the memory 624 and executes the instructions. The memory 624 may include any of various types of memory devices, such as, for example, random access memory (RAM), read-only memory (ROM), flash memory, one or more mass storage devices (e.g., disks), etc. The memory 624 stores instructions of a storage operating system 630, such as the storage operating system 24 illustrated in FIG. 6A. Techniques described above can be implemented by the storage operating system 630. The processor 622 may retrieve the instructions from the memory 624 to run the storage operating system 630. In some embodiments, a portion of the memory 624 is used to implement a replication queue, such as the replication queue 430 in FIG. 4 described above. The storage server 600 interfaces with one or more storage servers (e.g., the source storage servers 110 in FIG. 3) via the storage adaptor 628, which may include a SCSI adaptor, Fibre Channel adaptor, etc.

Some portions of the preceding detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a machine-accessible medium, also referred to as a computer-readable medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer-implemented method comprising:
receiving data at a destination storage server from a source storage server;
temporarily holding the data in a replication queue at the destination storage server; and
sending an early write confirmation from the destination storage server to the source storage server if the source storage server is blocking further write operations due to not receiving a write confirmation for the data in the replication queue, wherein a write confirmation indicates data has been written to a destination volume and the early write confirmation is sent before the data in the replication queue is written to a destination volume.

2. The method of claim 1, further comprising:
writing previously received data to the destination volume while holding the data received in the replication queue.

3. The method of claim 1, wherein the data in the replication queue is associated with a plurality of write operations spanning across a plurality of consistency points of the source storage server.

4. The method of claim 1, wherein the data includes user data, and holding the data in the replication queue comprises storing the user data in persistent storage.

5. The method of claim 1, further comprising:
withholding the write confirmation from the source storage server if one or more predetermined conditions are met.

6. The method of claim 5, wherein the one or more predetermined conditions include the replication queue being full.

7. A machine-accessible medium that stores instructions which, if executed by a processor, will cause the processor to perform operations comprising:
writing, by a destination storage server, metadata of a persistent point-in-time image (PPI) of data in a source volume forwarded from a source storage server managing the source volume into a destination volume managed by the destination storage server synchronously with respect to a write operation performed on the source volume by the source storage server;
exporting, by the destination storage server to a client, the persistent point-in-time image (PPI) of the data of the source volume from the destination storage server asynchronously with respect to the write operation; and
sending an acknowledgement of the data from the destination storage server to the source storage server when the metadata has been written to the destination volume without waiting for the asynchronous exporting of the PPI to complete, wherein the source storage server is operable to perform subsequent write operations in response to receiving the acknowledgement instead of holding the subsequent write operations until the asynchronous exporting of the PPI is complete, the subsequent write operations being requested after the writing of the metadata has begun.

8. The machine-accessible medium of claim 7, wherein the destination volume is a mirror image of the source volume.

9. The machine-accessible medium of claim 7, further comprising:
making a prior version of the PPI visible to clients communicatively coupled to the destination storage server while exporting the PPI.

10. The machine-accessible medium of claim 9, further comprising:
making the PPI visible to the clients, instead of the prior version, when the PPI has been exported.

11. An apparatus comprising:
a buffer to hold a replication queue; and
a write processing module to temporarily place a block of data received from a source storage server into the replication queue and to send an early acknowledgement of writing the block of data in the replication queue into a destination volume to the source storage server while writing a previously received block of data into the destination volume if the source storage server is blocking further write operations due to not receiving an acknowledgment of the writing of the date in the replication queue, wherein an acknowledgment indicates data has been written to a destination volume and the early acknowledgment is sent before the data in the replication queue is written to a destination volume.

12. The apparatus of claim 11, further comprising:
a network adapter to couple to the source storage server via a network.

13. The apparatus of claim 11, further comprising:
a storage adapter to interface with a plurality of physical storage resources, wherein the volume comprises a logical data container managed independently from the plurality of physical storage resources.

14. The apparatus of claim 11, wherein the processing module is operable to withhold the acknowledgement from the source storage server if one or more predetermined conditions are met.

15. The apparatus of claim 14, wherein the one or more predetermined conditions include the replication queue being full.

16. The apparatus of claim 11, wherein the processing module is operable to write the block of data into the volume after the previously received block of data has been written into the volume.

17. A system comprising:
a first storage server to manage a first volume and to replicate data in the first volume to a destination volume; and
a second storage server communicatively coupled to the first storage server to receive data from the first storage server and to manage the destination volume, the second storage server comprises a buffer to hold a replication queue, wherein the second storage server temporarily places a block of data received from the first storage server in the replication queue and sends an early write confirmation for the block of data to the first storage server while a previously received block of data from the first storage server is being written into the destination volume if the first storage server is blocking further write operations due to not receiving a write confirmation for the data in the replication queue, wherein a write confirmation indicates data has been written to a destination volume and the early write confirmation is sent before the data in the replication queue is written to a destination volume.

18. The system of claim 17, wherein the first storage server is operable to send a second block of data to the second storage server in response to the write confirmation.

19. The system of claim 17, wherein the second storage server is operable to write the block of data into the destination volume after the previously received block of data has been written into the destination volume.

20. A system comprising:

a source storage server to manage a source volume;

a destination storage server communicatively coupled to the source storage server and a destination volume, the destination storage server operable to write data of the source volume into the destination volume synchronously with respect to write operations performed on the source volume, and the destination storage server further operable to send an acknowledgement of the data to the source storage server when the data has been written to the destination volume without waiting for a persistent point-in-time image (PPI) of the data of the source volume to be exported by the destination storage server to a client, wherein the source storage server is operable to perform subsequent write operations in response to receiving the acknowledgement instead of holding the subsequent write operations until the exporting of the PPI is complete, the subsequent write operations being requested after the writing of the data has begun.

21. The system of claim 20, wherein the source storage server and the destination storage server are coupled to each other in a bi-directional configuration such that the source storage server manages a second destination volume, which is a mirror image of a second source volume managed by the destination storage server.

22. The system of claim 20, wherein the destination storage server comprises a mirror module operable to export the PPI of the data of the source volume asynchronously with respect to the write operations.

* * * * *